United States Patent
Iwashiro (10) Patent No.: US 6,934,116 B2
(45) Date of Patent: Aug. 23, 2005

(54) METHOD AND APPARATUS FOR HEAD POSITIONING CONTROL IN A DISK DRIVE

(75) Inventor: Masafumi Iwashiro, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 170 days.

(21) Appl. No.: 10/348,906

(22) Filed: Jan. 23, 2003

(65) Prior Publication Data

US 2003/0174432 A1 Sep. 18, 2003

(30) Foreign Application Priority Data

Mar. 13, 2002 (JP) ........................................ 2002-069136
Mar. 13, 2002 (JP) ........................................ 2002-069137

(51) Int. Cl.$^7$ .............................................. G11B 5/596
(52) U.S. Cl. .................................................. 360/78.04
(58) Field of Search ........................... 360/78.04, 77.02, 360/78.14, 78.05, 78.09, 78.07, 77.04, 75, 46; 369/44.32

(56) References Cited

U.S. PATENT DOCUMENTS

| | | | | |
|---|---|---|---|---|
| 5,091,808 A | * | 2/1992 | Nigam | 360/78.05 |
| 5,299,075 A | | 3/1994 | Hanks | |
| 5,426,545 A | * | 6/1995 | Sidman et al. | 360/78.09 |
| 5,434,725 A | * | 7/1995 | Hirose et al. | 360/77.04 |
| 5,550,685 A | | 8/1996 | Drouin | |
| 5,663,847 A | | 9/1997 | Abramovitch | |
| 5,917,672 A | | 6/1999 | Pham et al. | |
| 5,991,112 A | | 11/1999 | Song et al. | |
| 6,088,187 A | * | 7/2000 | Takaishi | 360/78.05 |
| 6,094,316 A | * | 7/2000 | Pham et al. | 360/46 |
| 6,320,720 B1 | * | 11/2001 | Hattori | 360/78.05 |
| 6,335,845 B1 | * | 1/2002 | Yamaguchi et al. | 360/75 |
| 6,407,876 B1 | * | 6/2002 | Yamaguchi et al. | 360/75 |
| 6,417,983 B1 | * | 7/2002 | Yatsu | 360/77.04 |
| 6,429,997 B1 | * | 8/2002 | Oida | 360/78.07 |
| 6,469,861 B2 | * | 10/2002 | Onuki et al. | 360/77.02 |
| 6,469,863 B1 | * | 10/2002 | Ell | 360/78.04 |
| 6,567,230 B1 | * | 5/2003 | Kagami et al. | 360/75 |
| 6,574,067 B2 | * | 6/2003 | Chen et al. | 360/77.04 |
| 6,654,198 B2 | * | 11/2003 | Liu et al. | 360/77.04 |
| 6,785,204 B1 | * | 8/2004 | Okuyama et al. | 369/44.32 |

FOREIGN PATENT DOCUMENTS

| | | |
|---|---|---|
| JP | 3-102683 | 4/1991 |
| JP | 7-130114 | 5/1995 |
| JP | 2584242 | 2/1997 |
| WO | WO 00/63907 | 10/2000 |

* cited by examiner

Primary Examiner—David Hudspeth
Assistant Examiner—Fred F. Tzeng
(74) Attorney, Agent, or Firm—Pillsbury Winthrop Shaw Pittman LLP (57) ABSTRACT

There is disclosed a head positioning control system including a feedforward (FF) control system to compensate a disturbance in a disk drive. This system includes an identification unit which executes parameter identification processing to determine a transfer function of the FF controller as well as a control operation. This identification unit updates a transfer characteristic of the FF controller so as to be adapted to a disturbance fluctuation.

19 Claims, 11 Drawing Sheets

METHOD AND APPARATUS FOR HEAD POSITIONING CONTROL IN A DISK DRIVE

CROSS-REFERENCE TO RELATED APPLICATIONS

This application is based upon and claims the benefit of priority from the prior Japanese Patent Applications No. 2000-069136, filed Mar. 13, 2002; and No. 2000-069137, filed Mar. 13, 2002, the entire contents of both of which are incorporated herein by reference.

BACKGROUND OF THE INVENTION

1. Field of the Invention

The present invention generally relates the a field of disk drives, and more particularly to a head positioning control technique.

2. Description of the Related Art

Conventionally, in a disk drive as typified by a hard disk drive, a head positioning control system used to position a head (magnetic head) is provided at a target position (track as an access target) on a disk data storage medium. The head executes a read/write operation of data at the target position on the disk.

The head positioning control system includes a feedback control system using a microprocessor (CPU) as a controller. The feedback control system drives and controls a voice coil motor (VCM) of an actuator having the head mounted thereon and executes follow-up control over the head relative to the target position.

As the head positioning control system, there has been developed or proposed a system including a disturbance feedforward control system (Sometimes also called an "FF control system") as well as the feedback control system. The FF control system suppresses the influence of vibrations or impacts (which will be generically referred to as disturbance hereinafter) applied from the outside to the disk drive.

The FF control system calculates a compensation value used to suppress the influence of the disturbance based on an acceleration value of the disturbance detected (observed) by an acceleration sensor provided in the disk drive. The head positioning control system uses the compensation value calculated by the FF control system, and absorbs a fluctuation generated by the disturbance when performing the follow-up control over the head in the feedback control system.

The FF control system includes a controller (which will be referred to as an FF controller hereinafter) having a predetermined transfer characteristic (determined as a transfer function F). The FF controller executes a digital filtering calculation using the acceleration value of the disturbance obtained from the acceleration sensor as an input. The head positioning control system adds the compensation value, which is an arithmetic operation result from the FF control system, to a control value calculated by the feedback control system, thereby suppressing a fluctuation in head position error generated due to the disturbance.

In short, in a head positioning control system including the FF control system, compensation relative to the disturbance applied during drive of the disk drive can be realized. In the head positioning control, therefore, a fluctuation in position error generated due to the disturbance can be suppressed, thereby improving the head positioning accuracy.

The performance of the FF control system depends on settings of the transfer function F of the FF controller.

Usually, the transfer function F is determined based on a fluctuation characteristic of an acceleration of the disturbance (determined as a transfer function K), a position fluctuation characteristic obtained by the disturbance (determined as a transfer function W), a characteristic of a plant (determined as a transfer function P) and others. Here, the plant means an actuator including the VCM as a control target. The characteristic of the plant means, therefore, a mechanical characteristic (rigidity, resonance, damping factor) of the actuator.

Further, in actual disk drives, there are mechanical irregularities in each drive product, an attachment angle of an acceleration sensor, a relative angle of a head positioning location, a direction of the disturbance, an age-based change. Therefore, the transfer functions (K, W and P) in each of the above-described elements vary. Accordingly, it is desirable to adopt a method of determining the appropriate transfer function F of the FF control system by measuring these transfer functions when using the disk drive. If such a method is used, stable control against disturbances can be executed, and an improvement in the head positioning accuracy can be expected.

For these reasons, as a head positioning control system, a system including a parameter identification function used to determine the transfer function F of the FF control system is known. If such a system is employed, the head positioning accuracy with respect to the disturbance can be improved by updating the transfer function F in accordance with mechanical irregularities of each drive product or a change in environment during use.

Meanwhile, in general, as for the operation of the head positioning control system, control of the FF control system and the parameter identification processing of the system are different operations. Therefore, in cases where the disturbance such as sweep excitation occurs, if the head positioning accuracy is considerably deteriorated due to an age-based fluctuation in a disturbance value during execution of the control, the operation of the FF control system must be temporarily stopped. That is, after executing the parameter identification processing of the FF control system, the operation to again execute the control of the system is required. In such a method, the head positioning accuracy is temporarily deteriorated during execution of the parameter identification processing. Furthermore, since an algorithm to perform a switching operation from the control execution to the parameter identification operation is required, there is a problem that firmware (program of the CPU) is complicated.

BRIEF SUMMARY OF THE INVENTION

In accordance with one aspect of the present invention, there is provided a disk drive having a head positioning control system which executes follow-up control by a feedback control system and disturbance compensation by a feedforward control system. The head positioning control system executes control over the feedforward control system and parameter identification processing which determines a transfer function of the feedforward control system.

The disk drive according to one aspect of the present invention has a head positioning control system used to perform positioning control over a head at a target position on a disk. The head position control system includes:

a follow-up control which executes a control operation in accordance with a predetermined servo cycle based on a position error between a current position of the head and the target position with an actuator mechanism which moves the head being determined as a control target, a disturbance detection unit which detects a disturbance applied from the outside, a feedforward controller which executes feedforward control which suppresses the influence of the disturbance during the control operation of the follow-up controller, and an identification unit which executes parameter identification processing which determines a transfer function of the feedforward controller; and a head which reads/writes data at the target position on a disk medium.

DETAILED DESCRIPTION OF THE INVENTION

Preferred embodiments according to the present invention will now be described with reference to the accompanying drawings.

(Structure of Disk Drive)

Figure 1:
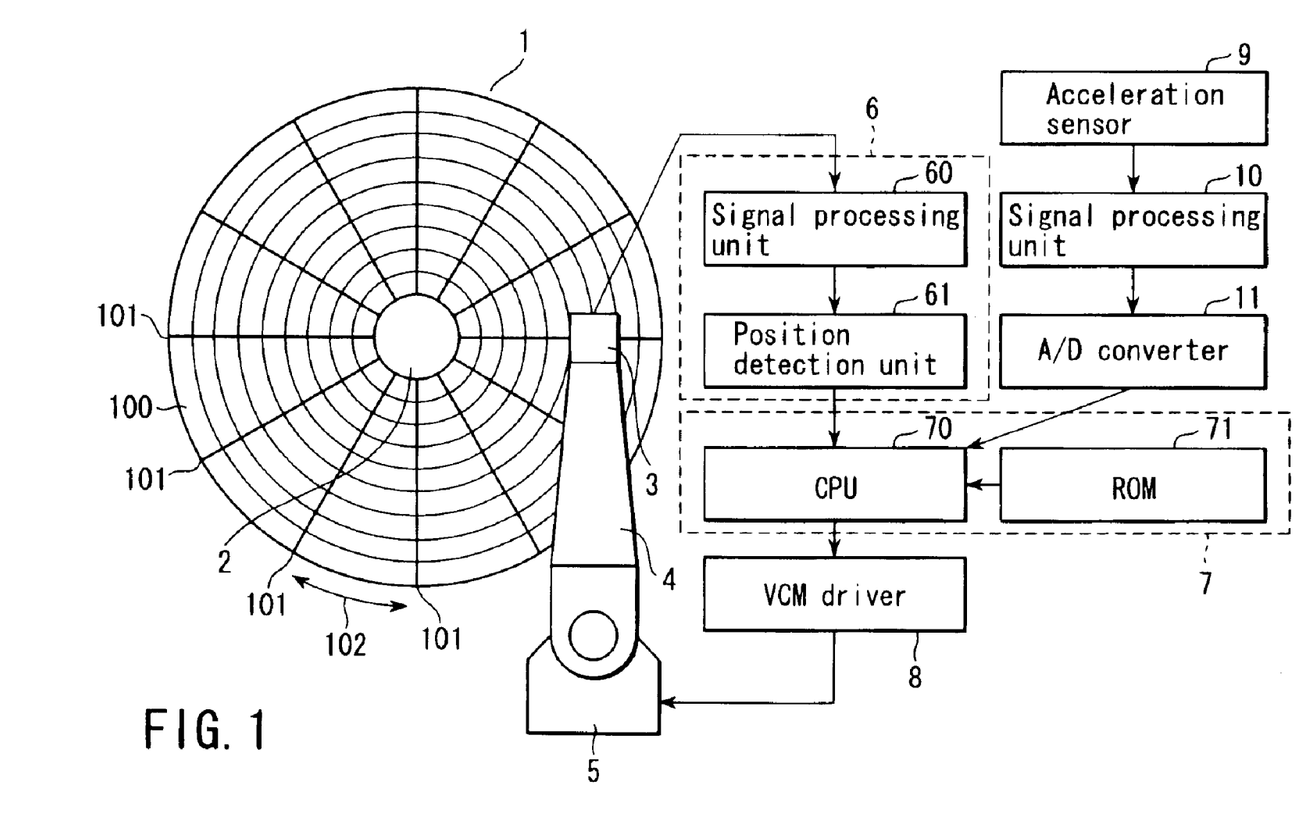
FIG. 1 is a block diagram showing a primary part of a disk drive concerning each embodiment according to the present invention.

A disk drive according to this embodiment has, as shown in FIG. 1, a disk 1 as a data storage medium, a spindle motor (SPM) 2, a head 3 which executes a data read/write operation, and an actuator 4.

The disk 1 is rotated by the SPM 2. The disk 1 has many tracks 100 having a concentric circle shape provided on a surface thereof. Each track 100 includes a predetermined number of servo areas 100 arranged at predetermined intervals in a circumferential direction. Servo data used to detect the position of the head 3 in the head positioning control system is recorded in the servo area 101 during a regular read/write operation.

The head 3 is usually mounted on a slider with a read head and a write head being separated from each other. The head 3 is mounted on the actuator 4, moved in the radial direction of the disk 1 by the drive force of the voice coil motor (VCM) 5. The VCM 5 is a control target (plant) in a narrow sense in the head positioning system, and the main element of the actuator mechanism.

Further, the disk drive has a read/write channel 6, a microcontroller 7, a VCM driver 8, and an acceleration sensor 9. The read/write channel 6 has a signal processing unit 60, included in the head 3, which processes a read signal or write signal corresponding to servo data or user data read by the read head. In addition, the read/write channel 6 includes a position detection unit 61 which extracts the servo data from the read signal and generates a position detection signal used to detect the position of the head 3.

The microcontroller 7 has a microprocessor (CPU) 70 which is a main element of the head positioning control system and a ROM 71 which stores a program (firmware) for the microprocessor and various control parameters. As described later, the CPU 70 realizes a feedback control system and a feedforward control system (FF control system) constituting the head positioning control system. The FF control system realizes a function to compensate for a disturbance.

The VCM driver 8 generates a drive current according to a control value (including a compensation value obtained by the FF controller) from the CPU 70 and supplies it to the VCM 5. The acceleration sensor 9 detects (observes) an acceleration of a disturbance corresponding to vibrations or impacts applied to the disk drive, and outputs a detection signal of the acceleration to an acceleration signal processing unit 10. The acceleration signal processing unit 10 has a filter (LPF and the like) which amplifies a detection signal from the acceleration sensor 9 and reduces noises. An A/D converter 11 converts the acceleration signal into a digital acceleration value (noted as A), and outputs it to the CPU 70.

(Head Positioning Control System)

A structure and an operation of the head positioning control system concerning a first embodiment will now be described with reference to FIGS. 2 to 6.

Figure 4:
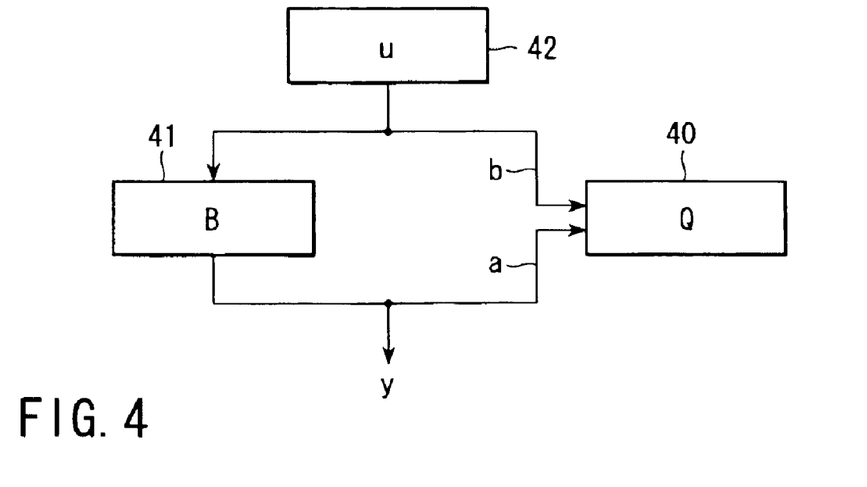
FIG. 4 is a view for illustrating a parameter identification method of an FF control system concerning the first embodiment.

A theoretical operation of this system will be first explained in connection with FIGS. 4 to 6.

As described above, this system is realized by the CPU 70. The CPU 70 acquires the current position of the head 3 from a position detection circuit 61 in synchronization with the rotation angle of the disk 1. Additionally, a sampled data control system is realized by the CPU 70. The sampled data control system calculates a control value (determined as u) inputted to a control target 21 (VCM 5) at fixed time intervals (servo cycle). Note that the maximum drive current supplied to the VCM 5 is pre-set by the VCM driver 8.

Figure 6:
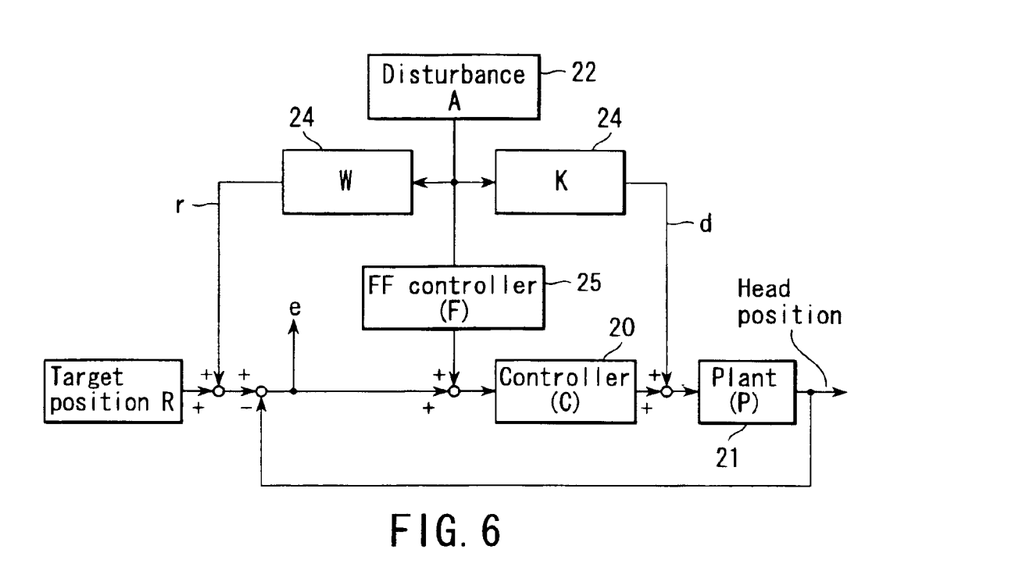
FIG. 6 is a block diagram for illustrating a theoretical structure of the system.

As shown in FIG. 6, this system outputs to the control target 21 a control value calculated in a predetermined servo cycle (sample interval) by a follow-up controller (transfer function C) 20 constituting the feedback control system, and performs follow-up control over a head position to a target position on the disk.

On the other hand, the FF control system has a feedforward controller (which will be referred to as an FF controller hereinafter) 25 as a main element. The FF controller 25 acquires an acceleration value (A) of a disturbance observed by an acceleration sensor 22 at a timing with which a current position of the head can be obtained.

Description will now be given as to a parameter identification method of determining a transfer characteristic (F) of the disturbance FF controller with reference to FIG. 4.

This method utilizes a so-called least square. FIG. 4 has a parameter identification unit 40 (transfer function Q), an identification target 41 (transfer function B) corresponding to the FF controller 25, and an identification input unit 42 (transfer function u) as elements.

The parameter identification unit 40 uses the identification target 41 as a discrete system and estimates a transfer characteristic based on the relationship between an input (u) and an output (y) of the identification target 41. This relationship is represented by the following expression (1).

$$y(k)=a_1y(k-1)+\ldots+a_ny(k-n)+b_0u(k)+\ldots+b_nu(k-n) \quad (1)$$

Here, a is a coefficient parameter on the output side of the parameter identifier 42 and b is a coefficient parameter on the input side of the same. k is a step number of the discrete system.

Further, an unknown parameter vector θ and an input/output vector ξ(k) are defined as represented by the following expression (2).

$$\theta=[a_1\ldots a_nb_0\ldots bn]^T, \xi(k)=[y(k-1)\ldots y(k-n)u(k)\ldots u(k-n)]^T \quad (2)$$

Based on this definition, the expression (1) can be represented as the following expression (3).

$$y(k)=\theta^T\xi(k) \quad (3)$$

Here, an estimated value at a time (k−1) is used as an estimated value of the unknown parameter, and an identification model such as represented by the following expression (4) can be calculated.

$$\hat{y}(k)=\hat{\theta}^T(k-1)\xi(k) \quad (4)$$

Here, θ(k) is an estimated value of the unknown parameter, and θ(k−1) is an estimated value at a time k−1.

An identification error can be represented by the following expression (5).

$$e(k)=\hat{y}(k)-y(k) \quad (5)$$

An estimation of a parameter vector θ by the least square can be calculated by using measured data y(k), ξ(k) until the time k based on such an evaluation function as represented by the following expression (6).

$$J(k) = \sum_{i=1}^{k} (y(i) - \theta^T\xi(i))^2 \quad (6)$$

Here, θ which minimizes J(k) is decided and this is determined as θ(k).

As methods for determining the parameter vector θ, there are offline identification, which requires all past data in calculation of the estimated value, and online identification, which sequentially performs estimation in accordance with each identification step of the discrete system. In determination of the transfer function (F) of the disturbance FF controller 25, the latter having a smaller amount of data is desirable.

Concretely, the following expression (7) is calculated in accordance with each identification step by using a square matrix Γ(k) of the order (2n+1).

$$\Gamma(k) = \Gamma(k-1) - \frac{\Gamma(k-1)\xi(k)\xi^T(k)\Gamma(k-1)}{1+\xi^T(k)\Gamma(k-1)\xi(k)} \quad (7)$$

An initial value of Γ(k) is "Γ(0)=γI" based on a positive constant (γ) and a unit matrix (I).

An estimated value $\hat{\theta}(k)$ is calculated by the expression (8).

$$\hat{\theta}(k) = \hat{\theta}(k-1) - \frac{\Gamma(k-1)\xi(k)}{1+\xi^T(k)\Gamma(k-1)\xi(k)}e(k) \quad (8)$$

where $\hat{\theta}(0)=0$

Here, a transfer function from the disturbance detection (acceleration value A) to a head position error (e) in the system shown in FIG. 6 can be represented as the following expression (9).

$$\frac{e}{A} = \frac{W - FCP - KP}{1 + CP} \quad (9)$$

Where, P is a transfer function of the control target 21, and C is a transfer function of the follow-up controller 20. Furthermore, W is a position fluctuation characteristic of the disturbance and indicative of a transfer function from a disturbance value (A) to a target position fluctuation (r). This target position fluctuation (r) is generated when the drive case or the disk 1 is deformed due to a disturbance and the track which follows up by the follow-up controller 20 moves. Moreover, K is an acceleration fluctuation characteristic of the disturbance and indicative of a transfer function from the disturbance value (A) to an acceleration value (d) of the disturbance equivalently applied to the control value (u).

In order to suppress the influence of the disturbance (A) to the head position error (e), it is good enough to set the transfer function F of the FF controller 25 as represented by the following expression (10) in such a manner that the term of the numerator in the expression (9) becomes zero.

$$F = \frac{W - KP}{CP} \quad (10)$$

(System Including Parameter Identification Function)

Description will now be given as to the head positioning control system of the embodiment in accordance with the above-described theory with reference to FIGS. 2, 3 and 5.

Figure 2:
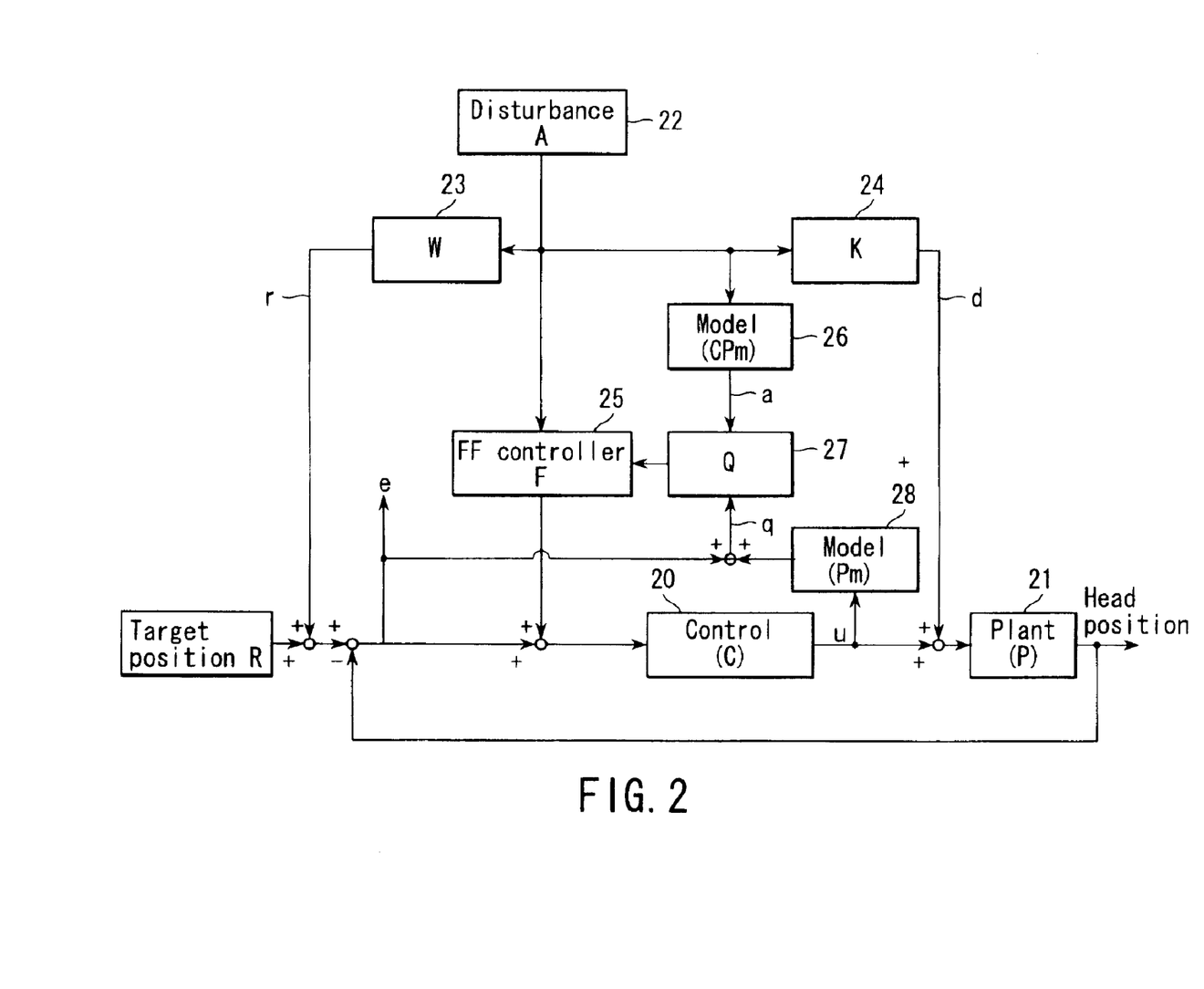
FIG. 2 is a block diagram showing a structure of a head positioning control system concerning a first embodiment.

As shown in FIG. 2, this system has an identification unit 27 which identifies a parameter used to determine the transfer function F of the FF controller 25. This system executes the parameter identification processing as well as the control execution of the FF controller 25.

The identification unit 27 inputs a signal (a) obtained from the disturbance value (A) through an open loop transfer characteristic model 26 to the input side. The open loop transfer characteristic model 26 is a filter function unit having each transfer function (CPm) of the follow-up controller 20 and the control target 21. Furthermore, the identification unit 27 inputs a signal (q) obtained from the control value (u) through the control target model 28 to the output side. The identification unit 27 inputs a result of adding the signal (q) and the position error signal (e).

Here, when the control target model Pm coincides with the transfer function (P) of the control target, the transfer characteristic from the disturbance (A) to the input side (a)

of the identification signal can be represented as the following expression (11).

$$a = ACT \tag{11}$$

Moreover, the transfer function from the disturbance (A) to the output side (q) of the identification signal can be represented as the following expression (12).

$$q = (W - KP)A \tag{12}$$

At this moment, the transfer function identified by the identification unit 27 can be represented as the following expression (13).

$$\frac{q}{a} = \frac{W - KP}{CP} \tag{13}$$

That is, as represented by the following expression (10), the transfer function identified by the identification unit 27 matches the transfer function (F) of the FF controller 25.

Figure 3:
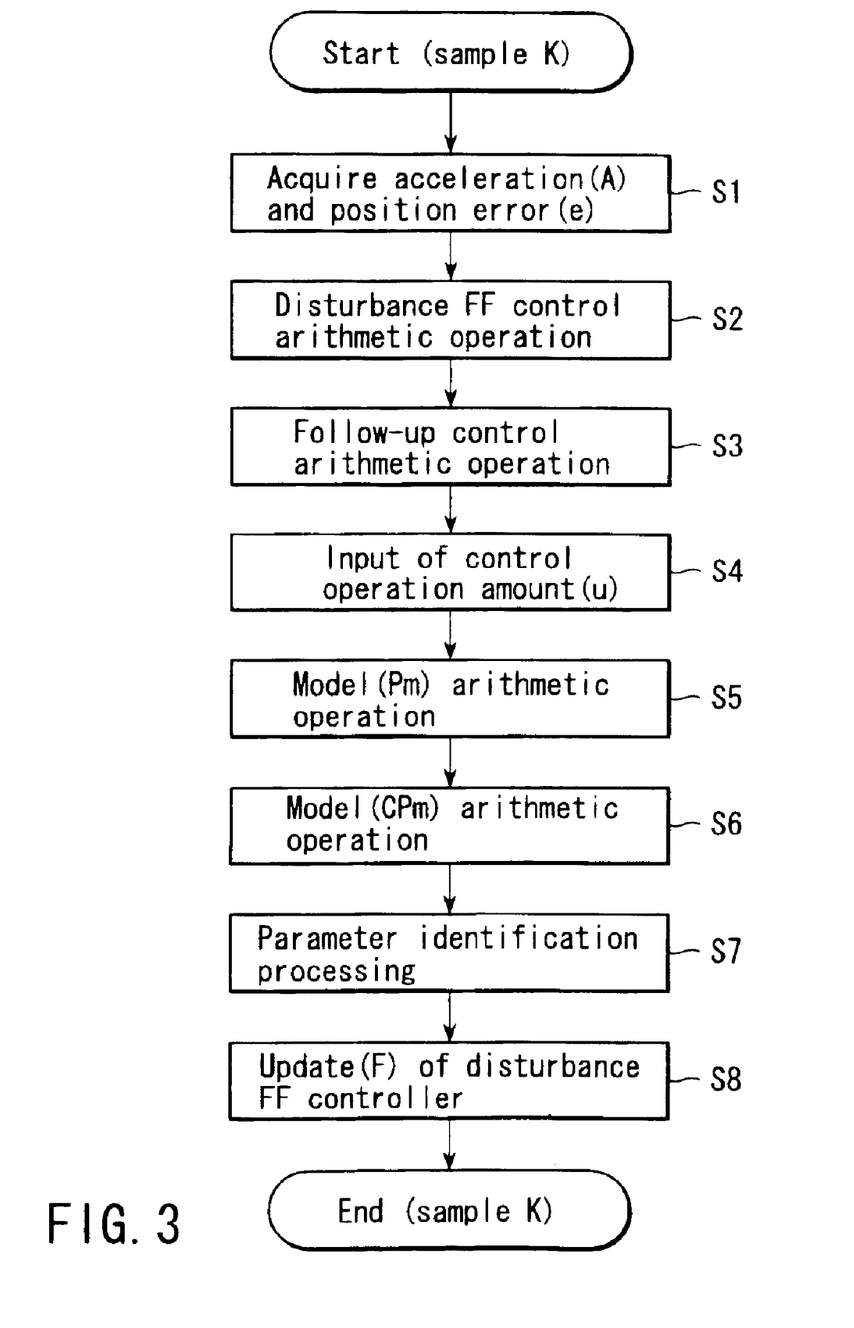
FIG. 3 is a flowchart for illustrating an operation of the system concerning the first embodiment.

FIG. 3 is a flowchart showing that this system (i.e., the CPU 70) executes control in accordance with a predetermined servo cycle (determined as a sample k) in the first half, and executes parameter identification, in order to determine (update) the transfer function (F) of the FF controller 25, in the last half.

That is, the CPU 70 executes the follow-up control (input of a quantity of control operation U), to eliminate the position error (e), by moving the head to the target position, as indicated by step S1 to step S4, in the first half (steps S3 and S4). At this moment, with application of the disturbance (A), the FF controller 25 calculates a compensation value used to suppress the disturbance, and executes processing to add this value to the position error (e) (step S2).

Then, the CPU 70 executes arithmetic calculation processing of least square, such as represented by the expression (11) to the expression (13), and performs the parameter identification processing (steps S5 to S7). As a result, the CPU 70 determines the transfer characteristic (F) of the FF controller 25 by using the identified parameter, and updates it from the previous value (step S8).

Figure 5:
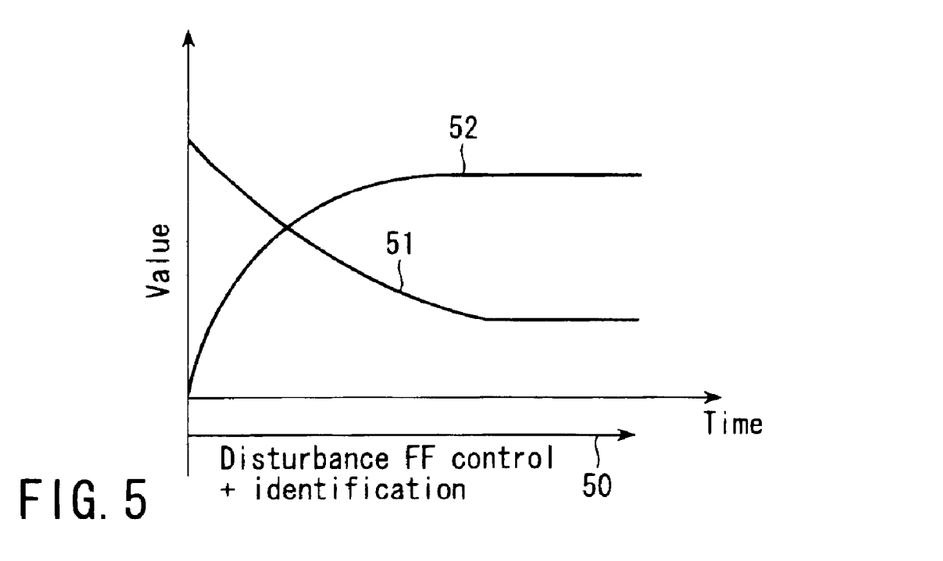
FIG. 5 is a view for illustrating a characteristic of the head positioning control system concerning the first embodiment.

FIG. 5 is a view showing age-based changes of the identification parameter and the head positioning accuracy when performing both the control execution of the FF controller 25 and the identification processing by using this system. As apparent from FIG. 5, with repetition of the identification step of the FF controller 25, the age-based change of the identification parameter becomes small, and the head positioning accuracy is improved.

As described above, according to this embodiment, it is possible to realize the head positioning control system which performs the control execution of the FF control system and the parameter identification processing in accordance with the servo cycle at a time. Therefore, even if the head positioning accuracy is considerably deteriorated due to an age-based fluctuation in the disturbance value during the control execution of the system, the head positioning accuracy can be automatically improved by adequately changing the identification parameter (namely, the transfer function F) of the FF control system.

In short, the head positioning control system which executes the follow-up control by the feedback control system and the disturbance compensation by the FF control system adopts the mode which collectively actuates the control execution of the FF control system and the parameter identification processing which determines the transfer function of the FF control system. Therefore, since the transfer function of the FF control system can be updated in accordance with a disturbance fluctuation, it is possible to avoid temporary deterioration in head positioning. As a result, since the disturbance compensation operation is not interrupted during execution of the head positioning control, stable and accurate head positioning control can be realized.

In other words, in this embodiment even if a disturbance fluctuation occurs during execution of the head positioning control, parameter identification processing can be executed without stopping control execution. Therefore, it is possible to avoid temporary deterioration of head positioning accuracy due to a disturbance fluctuation.

(Second Embodiment)

The second embodiment concerns a system including a parameter identification unit which updates the transfer function of the FF control system in accordance with the disturbance observed, during use of the disk drive in the head positioning system having the feedback control system and the FF control system.

The theoretical operation of the head positioning control system according to this embodiment is similar to that of the system illustrated in FIG. 6. It is to be noted that this system may adopt a mode which compensates for the effect of the disturbance (A) on the control input value from the follow-up controller 20 by using the FF control system. In this case, in regard to the transfer function from the disturbance detection (acceleration value A) to the head position error (e), a numerator of a right term in the expression (9) is "W–KP–FP". Further, as to the transfer function F of the FF controller 25, a denominator of a right term in the expression (10) is "P".

Furthermore, the parameter identification method used to determine the transfer function (F) of the FF controller 25 in this system is similar to the method described in connection with FIG. 4 based on the expressions (1) to (8).

Figure 8:
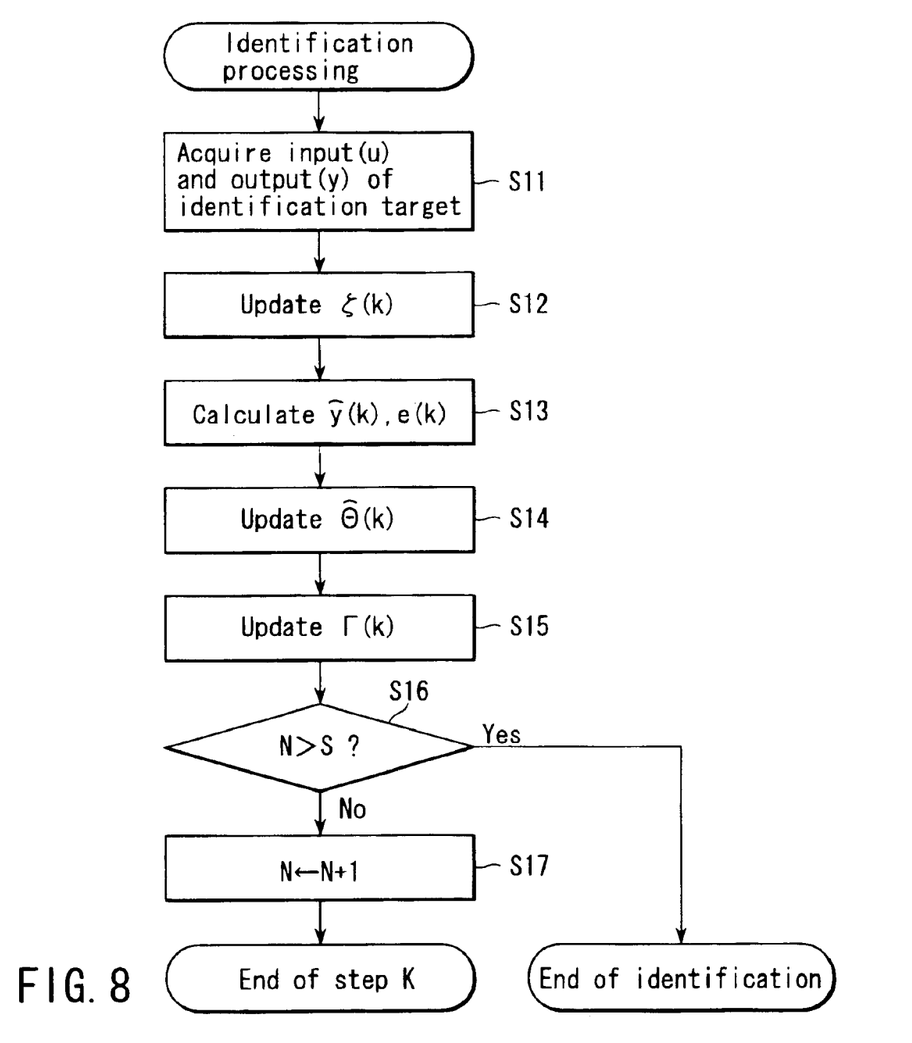
FIGS. 8 and 9 are flowcharts for illustrating a parameter identification method concerning the second embodiment.
Figure 9:
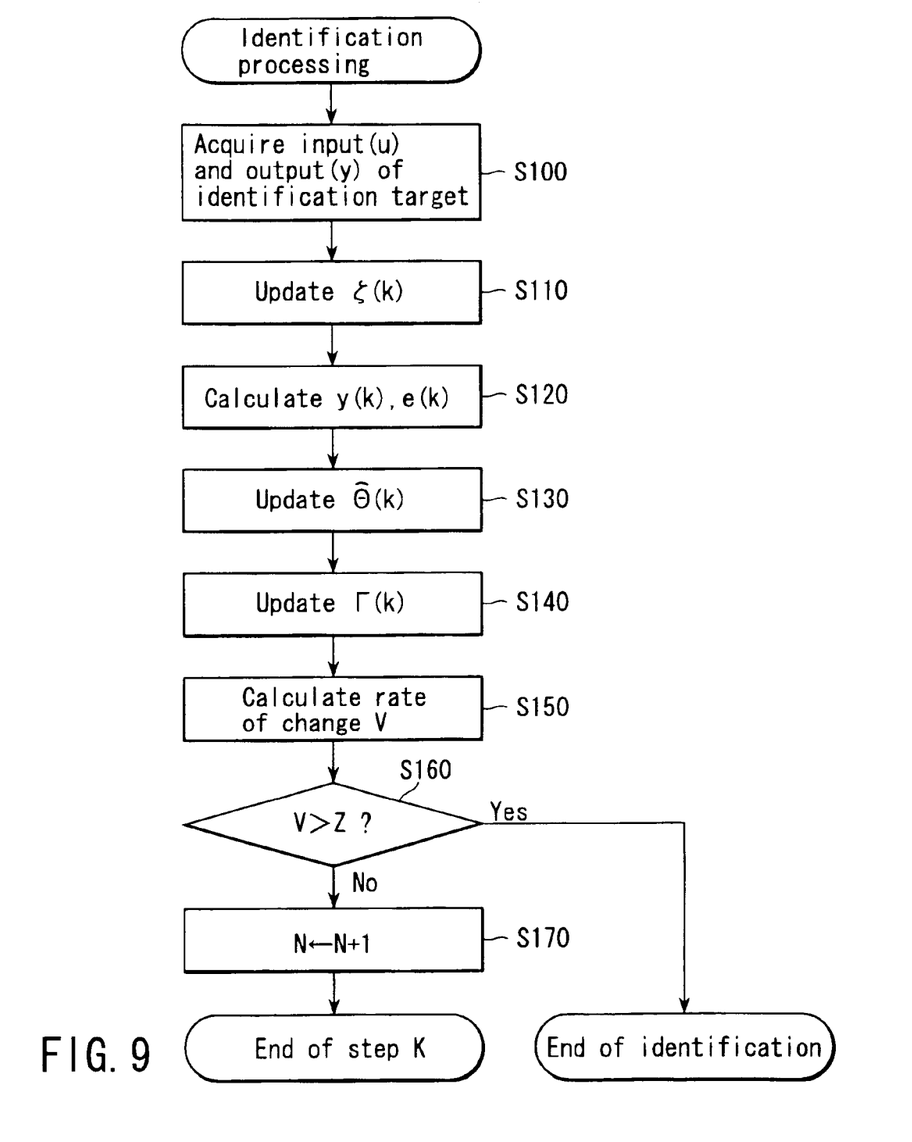

Here, the parameter identification unit 40 executes an identification processing step (k in this example) such as shown in the flowcharts of FIGS. 8 and 9 and estimates the transfer function (F) of the FF controller 25.

That is, the parameter identification unit 40 acquires the input (u) and the output (y) of the identification target 41 (step S11 or S100). Thereafter, the parameter identification unit 40 executes the calculation of the expression (2) (step S12 or S110).

Then, it executes the calculation of the expression (4) and the expression (5) (step S13 or S120). Furthermore, it executes the calculation of the expression (8) (step S14 or S130). Moreover, it executes the calculation of the expression (7) in accordance with each identification step (step S15 or S140)

Here, if the count number (N) of the identification step is greater than a sufficiently large constant (S), the parameter identification unit 40 terminates the identification processing (YES in a step S16). Otherwise, the parameter identification unit 40 continues the identification step (NO in S16, S17). In addition, the parameter identification unit 40 may judge an end of the identification processing based on a quantity of change (rate of change v) from the previous sample (k−1) of the parameter estimated value (method shown in FIG. 9).

That is, the parameter identification unit 40 calculate the following expression (14) (step S150).

$$v = |\hat{\theta}(k) - \hat{\theta}(k-1)| \tag{14}$$

If the rate of change (v) is sufficiently smaller than the constant (z), the parameter identification unit 40 terminates the identification processing (YES in a step S160). Otherwise, the parameter identification unit 40 continues the identification step (NO in a step S160, and a step S170).

(Modification of Parameter Identification Method)

Figure 10:
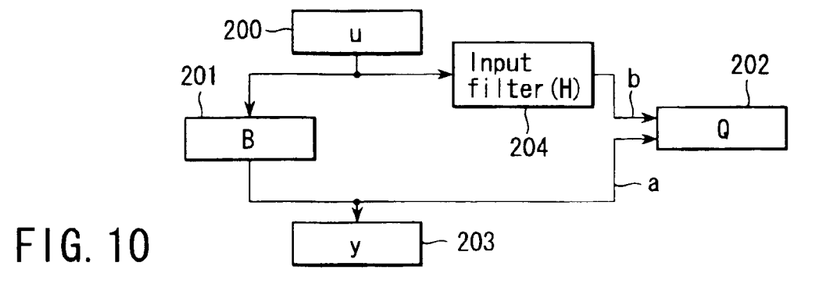
FIG. 10 is a view for illustrating a first modification of the parameter identification method.

FIG. 10 is a block diagram showing a first modification of the parameter identification method. This first modification corresponds to a case where an input filter 204 (transfer function H) is provided on the input side (b) of the parameter identification unit 202.

The input filter 204 is a discrete system represented by the expression (1). The transfer function is represented as the following expression (15).

$$\frac{y(k)}{u(k)} = \frac{b_0 Z^n + b_i Z^{n-1} \ldots + b_{n-1} Z + b_n}{Z^n - a_1 Z^{n-1} \ldots - a_{n-1} Z - a_n} \quad (15)$$

Here, as shown in FIG. 10, if the input filter 204 is provided on the input side (b), the parameter identification unit 202 identifies such a transfer function as represented by the following expression (16).

$$B = HQ, Q = \frac{B}{H} \quad (16)$$

Figure 11:
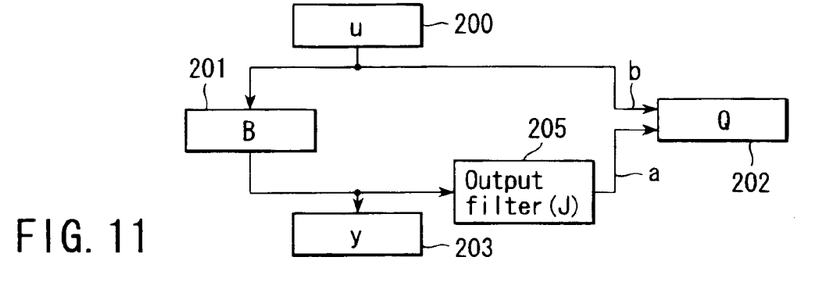
FIG. 11 is a view for illustrating a second modification of the parameter identification method.

Additionally, FIG. 11 is a block diagram showing a second modification of the parameter identification method. This second modification corresponds to a case where an output filter 205 (transfer function J) is provided on the output side (a) of the identification target 201.

The output filter 205 is a discrete system represented by the expression (1). The parameter identification unit 202 identifies such a transfer function as represented by the following expression (17).

$$Q = BJ \quad (17)$$

As described above, the parameter identification unit 202 can identify the transfer function of the discrete system different from the identification target 201 by arranging the input/output filters 204 and 205.

In general, in the parameter identification based on the least square, a convergence speed varies according to the frequency characteristic of the identification target 202, and a convergence time becomes very large when there is a frequency element close to an integration element. Information of the identification target 201 can be relatively easily predicted for a low frequency element. Therefore, constituting the identification input/output filters 204 and 205 by using known information and estimating only the high frequency element by using the parameter identification unit 202 is a practically effective method.

Further, in the parameter identification, the amount of arithmetic operation processing is determined based on the order of the discrete system represented by the expression (1), and the amount of arithmetic operation is increased by the square of the number of parameter estimation. Thus, the known information of the identification target 201 is added to the input/output filters 204 and 205 for identification, and the order is reduced by identifying only the unknown characteristic of the identification target 201, thereby reducing a quantity of arithmetic operation.

Here, assuming that Bm is a known part of the identification target 201 and Bn is an unknown part of the same, the transfer function B of the identification target 201 is defined as represented by the following expression (18).

$$B = B_m B_n \quad (18)$$

When the input filter 204 is provided, such a relationship as represented by the following expression (19) can be obtained.

$$H = B_m \quad (19)$$

Furthermore, when the output filter 205 is provided, such a relationship as represented by the following expression (20) can be obtained.

$$J = \frac{1}{B_m} \quad (20)$$

Therefore, the parameter identification unit 202 can estimate only the unknown part Bn of the identification target 201. When the known part Bm is stable, as represented by the expression (19), the method with the input filter 204 being provided is effective. On the other hand, when the known part Bm is unstable and "1/Bm" is stable, as represented by the expression (20), the method with the output filter 205 being provided is effective.

(Head Positioning Control System Including Parameter Identifier)

Figure 12:
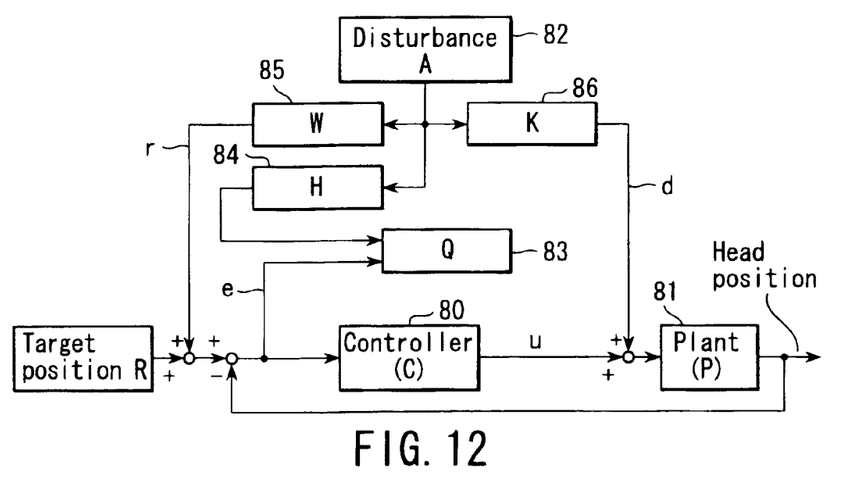
FIG. 12 is a block diagram showing a structure of the head positioning control system concerning the second embodiment.

FIG. 12 is a block diagram showing a primary part of a system including the parameter identification unit 83 which executes such a parameter identification method as mentioned above.

This system has a structure that the disturbance (acceleration value A) observed (detected) by the disturbance observation unit (sensor) 82 is applied to the parameter identification unit 83 through the input filter 84 (transfer function H) for identification. On the other hand, to the parameter identification unit 83 is applied a signal indicative of a position error (e) between the head position and the target position (R).

Here, as the FF control system (actually, the FF controller 88) as an identification target, a system adopting a mode of compensating the control value (u) outputted from the follow-up controller 80 is assumed. In this system, the transfer function H of the input filter 84 can be represented as the following expression (21).

$$H = \frac{P}{1 + CP} \quad (21)$$

Such a relational expression as represented by the following expression (22) can be obtained based on the expression (21), the expression (16) and the transfer function "(W−KP)/(1+CP)" from the disturbance (A) to the position error (e) of this system.

$$Q = \frac{B}{H} = \frac{W - KP}{1 + CP} \cdot \frac{1 + CP}{P} = \frac{W - KP}{P} \quad (22)$$

That is, this arithmetic operation result (Q) matches a transfer function F (F=(W−KP)/P) of the FF controller 88. In the expression (21), the transfer function C of the follow-up controller 80 is known. Furthermore, the transfer function P of the control target 81 is also a value which can be readily obtained as compared with the acceleration fluctuation characteristic K of the disturbance or the position fluctuation characteristic W of the disturbance in the disk drive.

Moreover, In the system adopting a mode of compensating the position error (e) by using the FF control system (FF controller 88), the transfer function H of the input filter 84 can be represented by the following expression (23).

$$H = \frac{CP}{1+CP} \quad (23)$$

Such a relational expression as represented by the following expression (24) can be obtained based on the expression (23), the expression (16) and the transfer function "(W−KP)/(1+CP)" from the disturbance (A) to the position error (e).

$$Q = \frac{B}{H} = \frac{W-KP}{1+CP} \cdot \frac{1+CP}{CP} = \frac{W-KP}{CP} \quad (24)$$

That is, this arithmetic operation result matches the transfer function F of the FF controller 88 represented by the expression (10).

Figure 13:
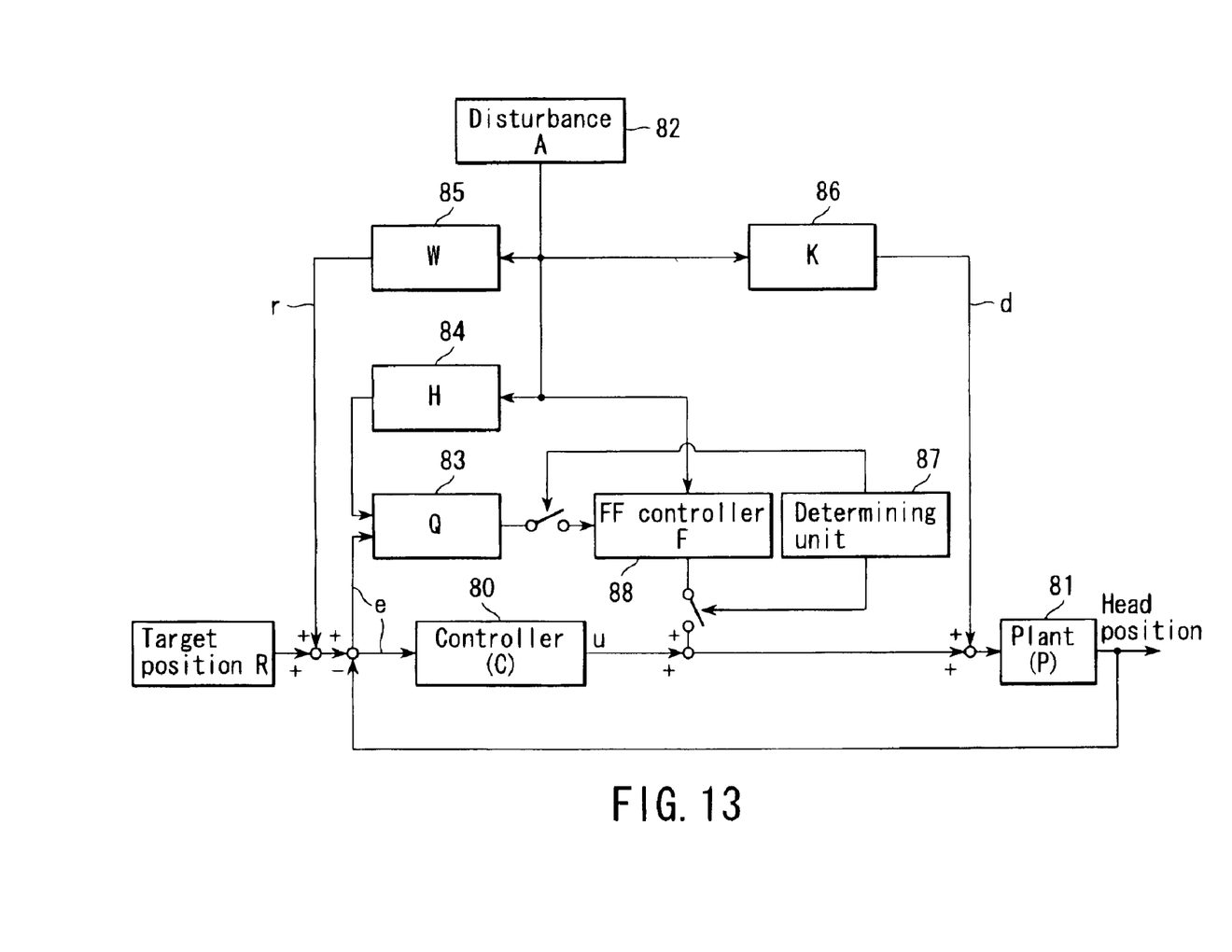
FIGS. 13 and 14 are block diagrams showing a structure of the head positioning control system to which a parameter identification method concerning the second embodiment is applied.
Figure 14:
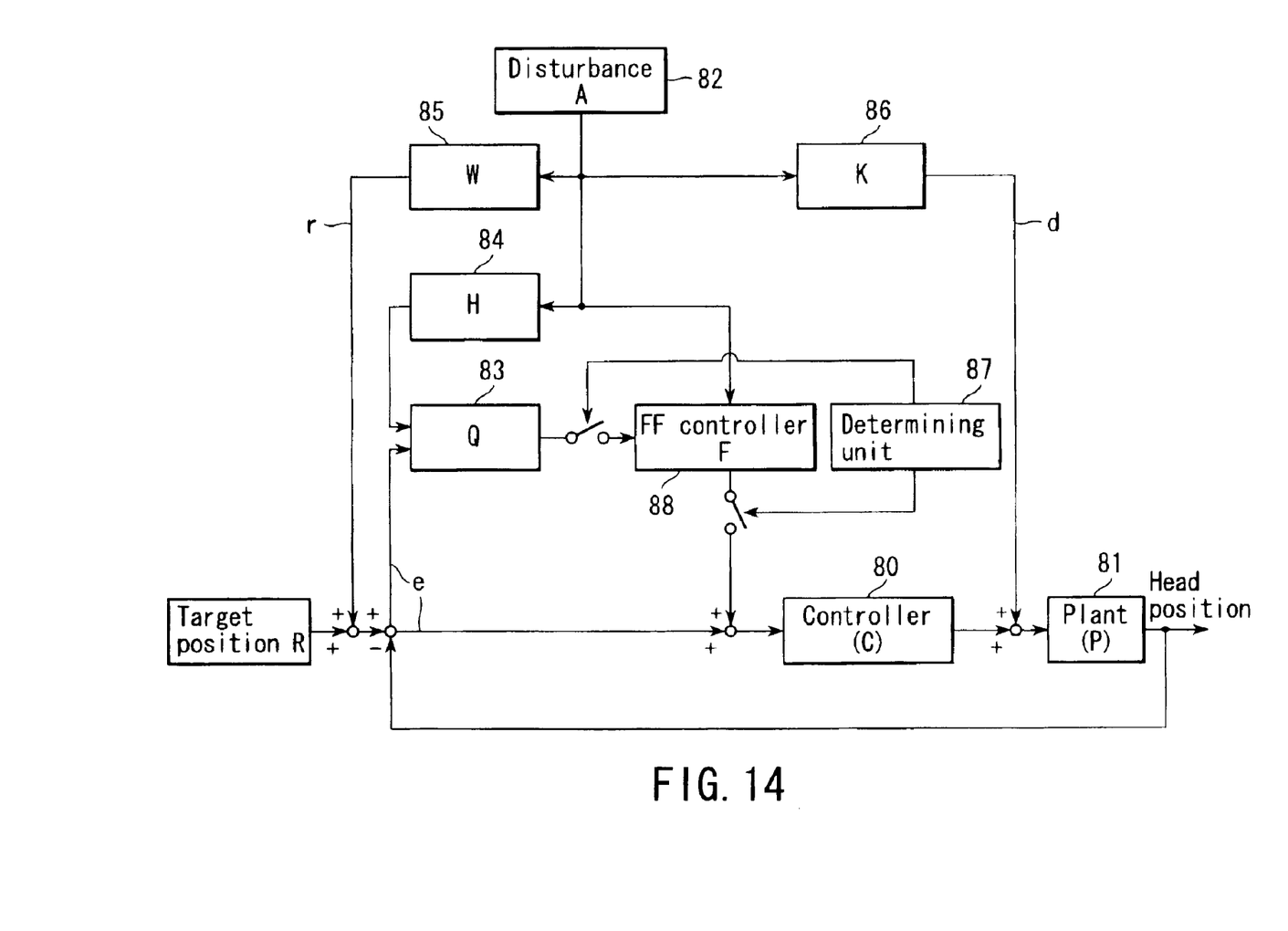

FIGS. 13 and 14 are block diagrams showing the structure of the head positioning control system including the parameter identification unit 83 and the FF controller 88.

The system shown in FIG. 13 compensates the control value (u) outputted from the follow-up controller 80 by the FF controller 88. On the other hand, the system shown in FIG. 14 compensates the position error (e) by using the FF controller 88. Both systems have the structure that the identification end judgment unit 87 controls the identification processing of the transfer function (F) of the FF controller 88 by the parameter identification unit 83 and the control execution of the FF controller 88 after identification.

Figure 15:
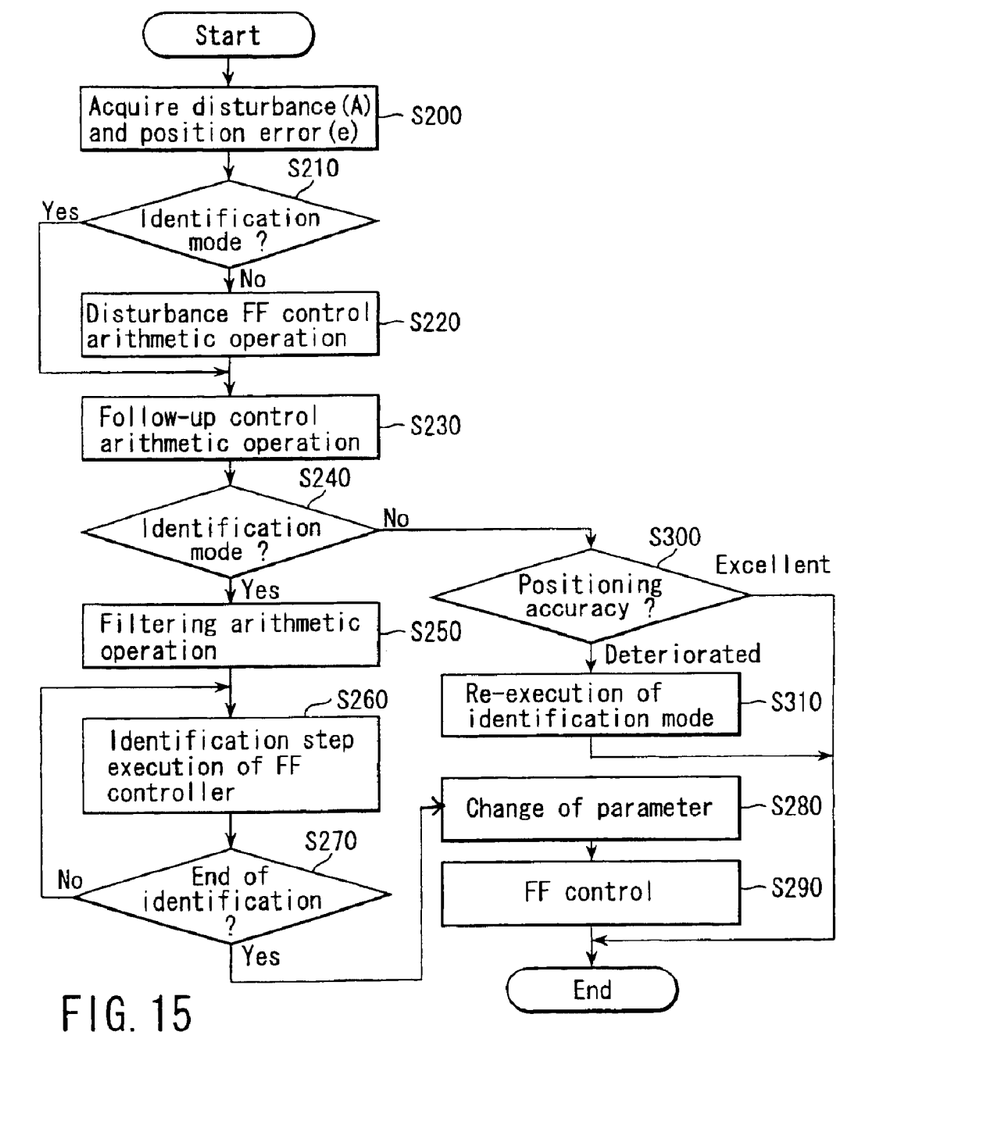
FIG. 15 is a flowchart for illustrating an operation of the head positioning control system concerning the second embodiment.

The operation of the system shown in FIG. 13 or FIG. 14 will now be described with reference to a flowchart of FIG. 15.

When the head positioning control (servo control) operation of the disk drive starts, the system (namely, the CPU 70) observes (detects) the position error (e) between a current position of the head and a target position (R) and a disturbance (acceleration value A) by the acceleration sensor 9 (disturbance observation portion 82) (step S200). Here, in a first sample (servo cycle), the identification mode of the FF control system is assumed (YES in a step S210).

In this mode, as shown in FIG. 13 or FIG. 14, an output from the FF controller 88 is in the off state. Moreover, an output from the parameter identification unit 83 is in the on state.

The follow-up controller 80 executes the follow-up control arithmetic operation based on the observed position error (e), and calculates the control value (u) (step S230). The parameter identification unit 83 executes a filtering arithmetic operation such as represented by the expression (21) or the expression (23) (YES in a step S240, and a step S250). Then, the parameter identification unit 83 executes such an identification processing step as shown in FIG. 8 or FIG. 9, and judges an end of the parameter identification processing (steps S260 and S270).

Upon completion of the identification processing, the parameter identification unit 83 updates the parameter of the FF controller 88, and freshly identifies the transfer function (F) adapted to the disturbance (step S280). Then, the control execution mode of the FF controller 88 begins from the next sample, and an output from the FF controller 88 enters the on state. In addition, an output from the parameter identification unit 83 is in the off state (step S290).

In the control execution mode, the FF controller 88 executes the control arithmetic operation, and compensates a fluctuation in the control value (u) due to the disturbance (A) or the position error (e) (NO in a step S210, and a step S220). Additionally, in the control execution mode, the CPU 70 executes evaluation of the head positioning accuracy. If it determines that the accuracy is deteriorated, the processing is shifted to re-execution of the identification mode from the next sample (steps S300 and S310).

As described above, according to the system of this embodiment, in the actual servo control on the disk drive, the parameter identification mode to determine the transfer function of the FF control system and the control execution mode of the FF control system are separately executed. Therefore, the transfer function (identification parameter) of the FF control system can be updated in accordance with an operating environment of the disk drive, mechanical irregularities of each product and others.

As a result, in the head positioning control system, a compensation function effective against the disturbance can be realized. In the operating environment of the actual disk drive, an improvement in the head positioning accuracy relative to the disturbance can be stably assured.

Figure 7:
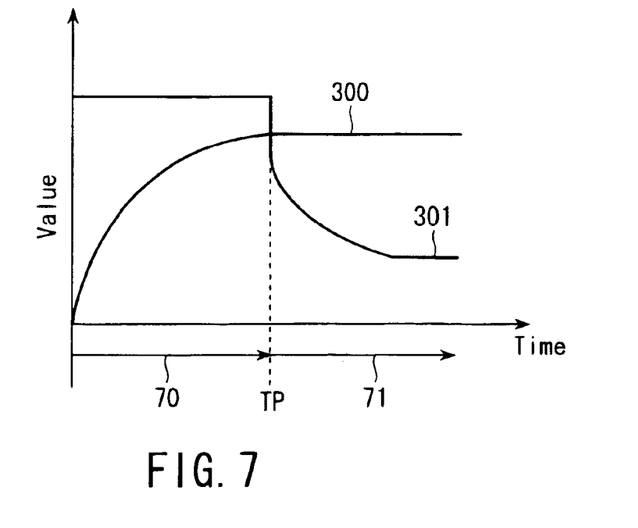
FIG. 7 is a view for illustrating a characteristic of a head positioning control system according to a second embodiment.

FIG. 7 shows an advantage of the system, and illustrates age-based changes of the identification parameter (characteristic 300) and the head positioning accuracy (characteristic 301). TP denotes a point in time when judgment of the identification processing process 70 is terminated in the FF control system. In other words, TP indicates a point in time when the parameter (transfer function) of the FF control system is updated. FIG. 7 shows that the head positioning accuracy is improved in the control execution operation 71 of the system from the point in time TP (characteristic 301).

The head positioning control system having such a structure executes the processing to identify the parameter which is the transfer function of the FF control system adapted to the observed disturbance when the disk drive is used. In other words, separately from the control execution mode of the FF control system, the parameter identification mode can be executed and the parameter can be updated. Therefore, the transfer characteristic of the FF control system can be updated so as to cope with a change in environment during use or mechanical irregularities of each product. Thus, in the actual operating environment, an improvement in the head positioning accuracy relative to the disturbance can be stably assured.

What is claimed is:

1. A disk drive comprising:
    a head which reads/writes data at a target position on a disk medium;
    an actuator mechanism which has the head mounted thereon and moves the head to the target position; and
    a head positioning control system which performs head positioning control over the head to the target position,
    wherein the head positioning control system includes:
    a follow-up controller which executes a control operation with the actuator mechanism which moves the head being determined as a control target in accordance with a predetermined servo cycle, based on a position error between current position of the head and the target position;
    a disturbance detection unit which detects a disturbance applied from the outside;
    a feedforward controller which executes a feedforward control to suppress the influence of the disturbance during a control operation of the follow-up controller; and
    an identification unit which executes parameter identification processing to determine a transfer function of the feedforward controller, and wherein the head positioning control system is configured to perform simultaneously a control execution of the feedforward controller and the parameter identification processing in accordance with the servo cycle.

2. The disk drive according to claim 1, wherein the disturbance detection unit includes an acceleration sensor which detects acceleration of the disturbance.

3. The disk drive according to claim 1, wherein the identification unit executes a filtering arithmetic operation according to the control target and a transfer function of the follow-up controller by using a disturbance value detected by the disturbance detection unit, the position error value and a control value calculated by the follow-up controller.

4. The disk drive according to claim 3, wherein the identification unit inputs a first signal (a) and a second signal (q) as input values and executes the parameter identification processing, the first signal (a) being an arithmetic operation result obtained by executing the filtering arithmetic operation according to an open loop transfer characteristic model (CP, where P means control target and C means follow-up controller) of the control target and the follow-up controller with respect to the disturbance value detected by the disturbance detection unit, and the second signal (q) being a result of adding an arithmetic operation result obtained by executing the filtering arithmetic operation according to a transfer characteristic model of the control target with respect to the control value and the position error value.

5. The disk drive according to claim 1, wherein the feedforward controller calculates a compensation value to absorb a fluctuation generated due to the disturbance during the control operation of the follow-up controller in accordance with the servo cycle based on an acceleration value corresponding to the disturbance value, and
   adds the compensation value to the position error value and inputs it to the follow-up controller.

6. The disk drive according to claim 5, wherein the identification unit inputs a first signal (a) and a second signal (q) as input value and executes the parameter identification processing, the first signal (a) being an arithmetic operation result obtained by executing the filtering arithmetic operation according to an open loop transfer characteristic model (CP, where P means control target and C means follow-up controller) of the control target and the follow-up controller with respect to the disturbance value detected by the disturbance detection unit, and the second signal (q) being a result of adding an arithmetic operation result obtained by executing the filtering arithmetic operation according to a transfer characteristic model of the control target with respect to the control value and the position error value.

7. A method of performing head positioning control over a head to a target position on a disk in a disk drive including the disk, the head and an actuator mechanism having the head mounted thereon, comprising:
   executing a follow-up control operation with the actuator mechanism being determined as a control target in accordance with a predetermined servo cycle based on a position error between a current position of the head and the target position;
   detecting a disturbance applied from the outside during the follow-up control operation;
   executing a feedforward control to suppress the influence by the disturbance; and
   executing parameter identification processing to determine a transfer function of a system which executes the feedforward control, wherein
   the feedforward control and the parameter identification processing are performed simultaneously in accordance with the servo cycle.

8. A disk drive comprising:
   a head which reads/writes data at a target position on disk medium;
   an actuator mechanism which has the head mounted thereon and moves the head to the target position; and
   a head positioning control system which performs head positioning control over the head to the target position,
   wherein the head positioning control system includes:
   a follow-up controller which executes a control operation with the actuator mechanism which moves the head being determined as a control target in accordance with a predetermined servo cycle, based on a position error between a current position of the head and the target position;
   a disturbance detection unit which detects a disturbance applied from the outside;
   a feedforward controller which executes a feedforward control to suppress the influence of the disturbance during a control operation of the follow-up controller; and
   an identification unit which executes parameter identification processing to determine a transfer function of the feedforward controller separately from execution of the feedforward control,
   wherein the identification unit is configured to perform a filtering arithmetic operation units according to the transfer function of the control target and the follow-up controller by using a disturbance value detected by the disturbance detection unit, the position error value and a control value calculated by the follow-up controller, and
   wherein the head positioning control system is configured to perform simultaneously a control execution of the feedforward controller and the parameter identification processing in accordance with the servo cycle.

9. The disk drive according to claim 8, further comprising:
   a judgment unit which judges an end of the parameter identification processing by the identification unit,
   wherein the judgment unit disables a function of the feedforward controller during execution of the parameter identification processing, and enables updating of the transfer function and execution of the feedforward control with respect to the feedforward controller after the end of the parameter identification processing.

10. The disk drive according to claim 9, wherein the judgment unit counts identification step and enables feedforward control after the count number of the identification step is greater than a sufficiently large constant.

11. The disk drive according to claim 9, wherein the judgment unit calculates a rate of change of identification parameters and enables feedforward control if the rate of change is less than a sufficiently small constant.

12. The disk drive according to claim 9, further comprising another judgment unit which judges a head positioning accuracy during execution of the feedforward control, and shift to re-execution of the identification mode if the accuracy is deteriorated.

13. The disk drive according to claim 8, wherein the identification unit inputs a first signal and a second signal as input values and executes the parameter identification processing, the first signal being an arithmetic operation result obtained by executing the filtering arithmetic operation according to the transfer function of the control target and the follow-up controller with respect to the disturbance value detected by the disturbance detection unit, and the second signal being the position error value.

14. The disk drive according to claim 13, wherein the first signal is an arithmetic operation result obtained by executing the filtering arithmetic operation according to a closed loop transfer characteristic model (CP/(1+CP), where P means control target and C means follow-up controller) of the control target and the follow-up controller with respect to the disturbance value detected by the disturbance detection unit.

15. The disk drive according to claim 13, wherein the first signal is an arithmetic operation result obtained by executing the filtering arithmetic operation according to a closed loop transfer characteristic model (CP/(1+CP), where P means control target and C means follow-up controller) of the control target and the follow-up controller with respect to the disturbance value detected by the disturbance detection unit.

16. The disk drive according to claim 13, wherein the first signal is an arithmetic operation result obtained by executing a filtering arithmetic operation according to a transfer characteristic model (P/(1+CP), where P means the control target and C means the follow-up controller) of the control target and the follow-up controller with respect to the disturbance value detected by the disturbance detection unit, the transfer characteristic model corresponding to multiplication of a sensitivity function of a closed loop transfer function by the transfer function of the control target.

17. The disk drive according to claim 8, wherein:
the feedforward controller calculates a compensation value to absorb a fluctuation generated by the disturbance during the control operation of the follow-up controller based on an acceleration value corresponding to the disturbance value,
adds the compensation value to the position error value, and
inputs it to the follow-up controller.

18. The disk drive according to claim 8, wherein:
the feedforward controller calculates a compensation value to absorb a fluctuation generated by the disturbance during the control operation of the follow-up controller based on an acceleration value corresponding to the disturbance value,
adds the compensation value to the control value calculated by the follow-up controller, and
inputs it to the control target.

19. A method of performing head positioning control over a head to a target position on a disk in a disk drive including the disk, the head and an actuator mechanism having the head mounted thereon, comprising:
executing a follow-up control operation with the actuator mechanism which moves the head being determined as a control target in accordance with a predetermined servo cycle, based on a position error between a current position of the head and the target position;
detecting a disturbance applied from the outside during the follow-up control operation;
executing a feedforward control to suppress the influence by the disturbance; and
executing parameter identification processing to determine a transfer function of the feedforward control separately from execution of the feedfoward control, the parameter identification processing including performing a filtering arithmetic operation according to the transfer function of the control target and the follow-up control by using a disturbance value detected by the disturbance detection, the position error value and a control value calculated by the follow-up control,
wherein the feedforward control and the parameter identification processing are performed simultaneously in accordance with the servo cycle.

* * * * *